United States Patent
Voltolina

(10) Patent No.: US 7,194,274 B2
(45) Date of Patent: Mar. 20, 2007

(54) METHOD AND ARRANGEMENT FOR TRANSFERRING POSITIONING INFORMATION BETWEEN CONTROLLING UNITS IN A MOBILE COMMUNICATION NETWORK

(75) Inventor: Elena Voltolina, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 10/510,933

(22) PCT Filed: Apr. 8, 2003

(86) PCT No.: PCT/SE03/00564

§ 371 (c)(1), (2), (4) Date: Oct. 8, 2004

(87) PCT Pub. No.: WO03/088701

PCT Pub. Date: Oct. 23, 2003

(65) Prior Publication Data

US 2005/0239475 A1    Oct. 27, 2005

(30) Foreign Application Priority Data

Apr. 10, 2002    (SE)    ................. 02011021

(51) Int. Cl.
*H04Q 7/20*    (2006.01)
(52) U.S. Cl. .............. 455/456.6; 455/432.1; 455/436; 455/437; 455/438; 455/440; 455/450; 455/456.1; 455/456.5; 370/331; 370/334; 342/147
(58) Field of Classification Search ............ 455/432.1, 455/436–440, 442–444, 448, 450–452.1, 455/456.1–457; 370/331, 334; 343/777; 342/147, 350, 354, 417
See application file for complete search history.

(56) References Cited

U.S. PATENT DOCUMENTS

| | | | |
|---|---|---|---|
| 5,999,522 A * | 12/1999 | Rohani | 370/331 |
| 6,167,036 A * | 12/2000 | Beven | 370/331 |
| 6,292,667 B1 * | 9/2001 | Wallentin et al. | 455/458 |
| 6,571,097 B1 * | 5/2003 | Takai | 455/436 |
| 6,594,492 B2 * | 7/2003 | Choi et al. | 455/436 |
| 6,757,544 B2 * | 6/2004 | Rangarajan et al. | 455/456.1 |
| 2002/0061764 A1 * | 5/2002 | Kim et al. | 455/522 |
| 2002/0094817 A1 | 7/2002 | Goran Rune et al. | |
| 2002/0151304 A1 * | 10/2002 | Hogan | 455/436 |
| 2003/0013443 A1 * | 1/2003 | Willars et al. | 455/432 |
| 2003/0021334 A1 * | 1/2003 | Levin et al. | 375/147 |
| 2003/0125046 A1 * | 7/2003 | Riley et al. | 455/456 |

FOREIGN PATENT DOCUMENTS

EP    1056304 A2    11/2000

OTHER PUBLICATIONS

3GPP TS 25.305 V5.4.0 (Mar. 2002). Technical Specification Group Radio Access Newtork; Stege 2 functional specification of User Equipment (UE), Positioning in UTRAN, (Release 5) Mar. 2000, pp. 1-53. [6.6.2], [6.6.2.1], [7.2], [8.2].
Swedish Patent Office, International Search Report for PCT/SE03/00564, dated Jun. 18, 2003.

* cited by examiner

*Primary Examiner*—Steve M. D'Agosta
(74) *Attorney, Agent, or Firm*—Roger S. Burleigh

(57) ABSTRACT

The present invention relates to a method and arrangements in a mobile telecommunication network for providing a first radio network controlling unit with positioning information for a mobile terminal. The mobile terminal is located within a cell and served by a radio base station covering said cell. The cell is identifiable by means of a cell Geographical Area Information, GAI, and the resources of the radio base station to the mobile terminal is controlled by a second Radio network controlling unit. The method in accordance with the present invention comprises the steps of determining a cell portion of the cell wherein the mobile terminal is located, associating the cell portion with a Cell Portion GAI and transmitting the Cell Portion GAI from the second radio network controlling unit that controls the resources of said radio base station to the first radio network controlling unit.

1 Claim, 2 Drawing Sheets

METHOD AND ARRANGEMENT FOR TRANSFERRING POSITIONING INFORMATION BETWEEN CONTROLLING UNITS IN A MOBILE COMMUNICATION NETWORK

FIELD OF THE INVENTION

The present invention relates to a method for determining a position of a mobile terminal in a mobile telecommunication network, e.g. a third generation (3G) mobile telecommunication network.

BACKGROUND OF THE INVENTION

The present invention relates to positioning in a mobile telecommunication network. A network supporting positioning is able to keep track of the position of the mobile terminals, also referred to as user equipment (UE) that are served by said network. Positioning is a feature offered by a mobile telecommunication network to support location-based services which is one of the most important applications of 3G networks.

In FIG. 1, a Universal Mobile Telephony System (UMTS) is depicted. The UMTS network comprises a Core Network (CN) 100 that is connectable to other networks such as the Internet, other mobile networks e.g. GSM systems and fixed telephony networks denoted POTS in FIG. 1. The CN 100 connects to a plurality of Radio Network Controllers (RNCs) 102 via a Iu interface 101. One RNC 102 is connected to another RNC 102 by another interface, the Iur interface 103. Furthermore, the respective RNC 102 controls a plurality of Node-Bs 104 comprising one or more base stations 106 that is connected to the RNC by means of the Iub interface 105. Each base station covers an area, i.e. a cell and is arranged to serve the mobile terminals within said cell. Finally, the mobile terminals 108, also referred to as User Equipments (UE) are connected to one or The present invention relates to all mobile telecommunication systems that comprises an interface, such as an Iur interface, between the radio network controlling units of the system. Thus, the present invention is not limited to a UMTS system and the protocols as described.

A comparatively simple method for providing positioning is to apply an identity of the cell, e.g. the cell-ID, and more precisely a description of the geographical area covered by the cell, e.g. the Geographical Area Information (GAI), that is related to the cell-ID, to retrieve the location of the UE. The GAI identifies the geographical area of a cell and is represented by a polygon. This implies that the location of a UE 108 can be determined by identifying the cells, or one of the cells, where the UE 108 is currently located and by associating the identity of the cell or cells with the GAI. It exists signalling support for this method over the Iur-interface in UMTS Terrestrial Radio Access Network (UTRAN), while it is assumed that signalling support over the Iub-interface is not required since each controlling-Radio Network Controller (C-RNC) should have extensive knowledge of the cells that it controls. The UTRAN interfaces Iur and Iub as well as the C-RNC will be further described below. That results in that the coverage area of the cell is mapped on geographical coordinates and the precision of the position of the UE is limited to the area of the cell.

More advanced solutions would be to adopt more complex positioning methods such as Observed Time Difference Of Arrival (OTDOA) or Assisted Global Positioning System (A-GPS). The main drawback for both of these solutions is their inherent complexity at implementation in a mobile communication system. Both A-GPS and OTDOA require GPS receivers in the network, and new measurements are required. Another drawback with A-GPS is that it may not work in indoor scenarios due to poor coverage of the satellites. Furthermore, OTDOA requires a sufficiently high number of node-B pairs available in order to achieve good accuracy of the position, since the UEs measure the relative timing difference between pairs of Node Bs. The accuracy of the position increases with the number of measurements. Another drawback is that a UE only can listen to one UE at a time. Good accuracy can thus theoretically be obtained by using idle periods in the downlink (IPDL). However, implementation of IPDL has hardware impacts and adds further complexity to the method.

Moreover, there is a tendency to design modern communication networks as distributed systems, which inter alia implies a distinction between network resources on the one hand and communication connections on the other hand. Resources may refer to, e.g., the various hardware components that are applied, and, for CDMA-based communication systems, the transmission power level and channelisation codes. In such systems it is common that different logical as well as physical units control different parts of the network. One unit is e.g. responsible for the control of a communication connection while another unit is responsible for the control of the resources that said communication connections use. This will now be illustrated by means of FIG. 1. The FIG. 1 shows a part of a UMTS Terrestrial Radio Access Network (UTRAN) 10, which can serve as an example of a distributed network as described above. Radio Network Controllers (RNC) 102*a*, 102*b* perform the control of communication connections and network resources respectively of the base stations 104*a*–104*d* and are responsible to provide connections to the Core Network 100. The RNCs 102*a*, 102*b* are connected to Node-B:s 104*a*–104*d*, wherein one Node-B comprises one or more radio base stations 106. Each base station 106 controls the UEs within its covered cell area. Due to the above-mentioned distinction, the RNC can have various roles: Regarding network resources, the RNC 102*b* acts as a controlling RNC (C-RNC) that is responsible for the control of resources of a part of said network including a number of cells, each of which serving a plurality of UEs 108. Regarding the communication connections, an RNC 102*a*, 102*b* acts as the serving RNC (S-RNC) for those connections that terminates in that RNC. However, when a UE 108 moves during an ongoing session from a first RNC 102*a*, which is the S-RNC for the corresponding communication connection, to a neighbouring RNC 102*b*, the original RNC 102*a* still remains the S-RNC for this connection while the second RNC 102*b*, which is in control of the resources that this connection uses, is a drift RNC (D-RNC) that supports the S-RNC 11*a* with the necessary radio resources; however, without any influence on said connection. Thus, the D-RNC controls at least one cell that is used in a radio connection controlled by a serving RNC and supplies the S-RNC with resources.

Thus, it is a problem, as previously described, that positioning information, that only is based on the cell-ID, is not accurate enough and may hence imply disadvantages for services where a more exact location of the UEs is required.

Another problem is that a S-RNC cannot get sufficient positioning information of a UE that has roamed during an ongoing session to a D-RNC, which provides network resources for said UE, while the S-RNC still controls the connection of said UE.

SUMMARY OF THE INVENTION

Therefore, it is a first object of the present invention to achieve a method and a system for providing an improved positioning information of UEs served by a communication network.

It is a second object of the present invention to achieve a method for providing such positioning information to an appropriate network controller unit, e.g. a serving RNC that does not provide the UE with network resources but only controls the connection to the UE.

The above-mentioned objects of the present invention are achieved by the inventive features that are stated in the accompanying claims.

The method in accordance with the present invention makes it possible to provide a first radio network controlling unit with positioning information for a mobile terminal wherein the mobile terminal is located within a cell and served by a radio base station whose resources are controlled by a second Radio network controlling unit. The cell is identifiable by means of a cell Geographical Area Information (GAI). The method comprises the step of transmitting the Cell Portion GAI, which is associated with the cell portion (23) being a portion of the cell wherein the mobile terminal (22) is located, from a second radio network controlling unit (102b) that controls the resources of said radio base station (21) to the first radio network controlling unit (102a) that controls the connection of said radio base station (21) to the mobile station (22).

The resource controlling radio network controlling unit in accordance with the present comprising means for associating the cell portion, being a portion of the cell wherein the mobile terminal is located, with a Cell Portion GAI, and means for transmitting the Cell Portion GAI to the connection controlling radio network controlling unit that controls the connection of said radio base station to the mobile station achieves the above mentioned objects.

The connection controlling radio network controlling unit in accordance with the present invention comprising means for receiving positioning information from a resource controlling radio network controlling unit for a mobile terminal, wherein the received positioning information is a Cell Portion GAI associated with the cell portion, being a portion of the cell wherein the mobile terminal is located, achieves the above mentioned objects.

The mobile telecommunication network in accordance with the present invention comprising the above mentioned connection controlling radio network and the above mentioned connection controlling radio network controlling unit for performing the steps of the above mentioned method, makes it possible to provide said connection controlling radio network with an improved positioning information of UEs served by said network.

An advantage with the present invention is that it can utilise beamforming, which mainly is introduced to gain system capacity. Thus, the beamforming is in accordance with the present invention also used to improve the accuracy of the Cell-ID based positioning method.

It is another advantage of the present invention that the additional information can reuse design efforts that already have been invested for mapping a cell-ID to a geographical area information.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

DETAILED DESCRIPTION

Figure 1:
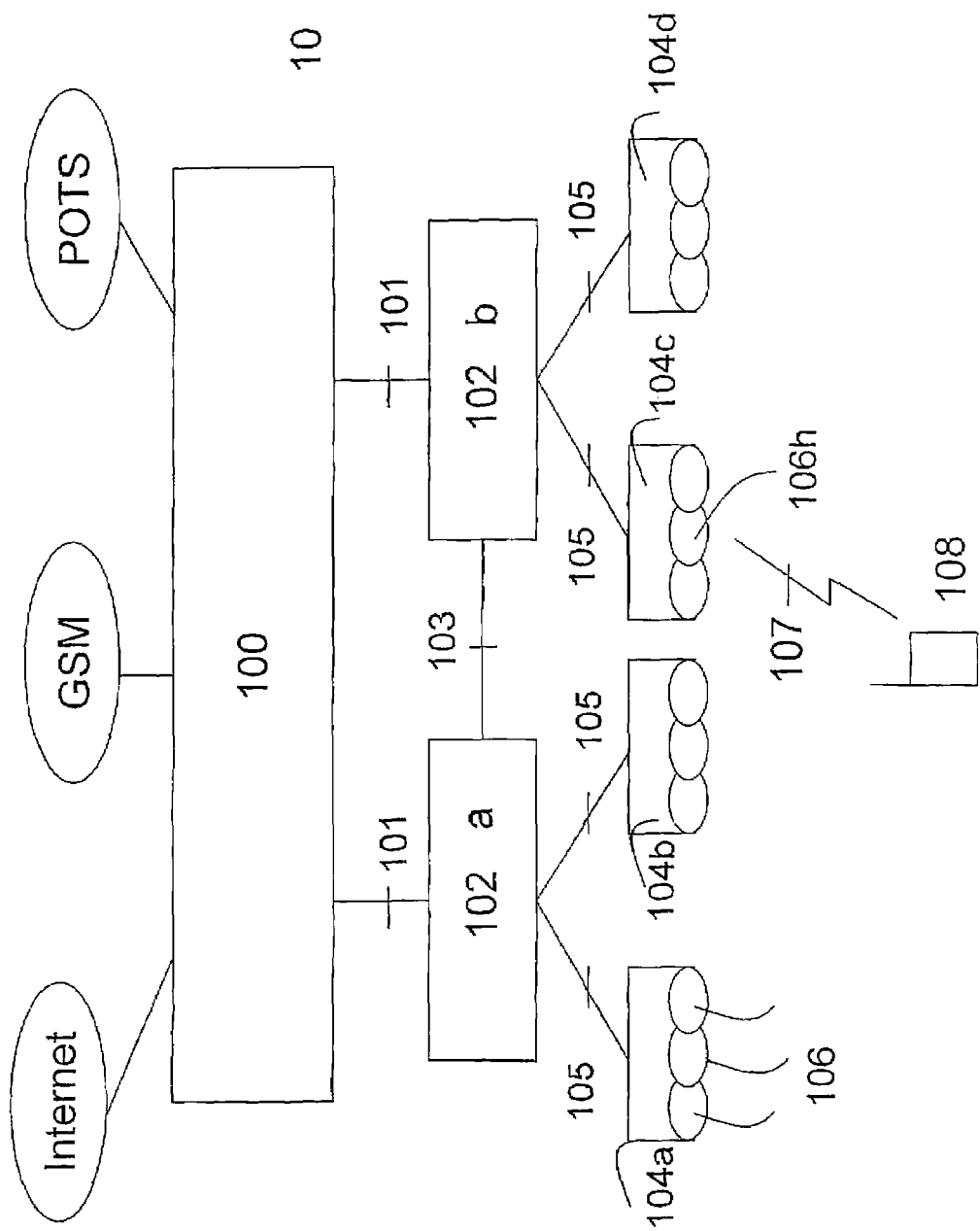
FIG. 1 shows a part of a UMTS network as an example wherein the present invention may be implemented and as an example of a distributed network.

FIG. 1 shows a UMTS network which is an example of a communication network wherein the method and system according to the present invention may be implemented.

The first object of the present invention is achieved by providing additional cell information to a radio network controlling unit, a S-RNC, in order to achieve a more accurate positioning of a UE e.g. compared to the cell-ID based positioning method of prior art as previously described. The additional information is in accordance with the present invention an identity of a cell portion, a Cell portion Geographical Area Identity (GAI). The Cell Portion GAI is defined in a similar way as the already standardised GAI and allows a more accurate positioning of the UE when applied together with said standardised GAI. A more accurate positioning implies thus a reduction of the area within which the UE is determined. Thus, a cell is divided into at least two Cell Portions in accordance with the present invention.

In accordance with one embodiment of the present invention, the cell portion GAI is obtained by applying beamforming antennas. Beamforming antennas is an array of antennas that forms one or several directed beams within the cell. Each antenna has controlled beam directions. By using the beamforming antennas, a better radio resource management is achieved, wherein an example is an increase of the system capacity.

Beamforming antennas is further discussed in the following. The UE can be instructed to use three different downlink dedicated physical channels as phase references: the Primary Common Pilot Channel (P-CPICH), which is broadcasted over the entire cell, a secondary Common Pilot Channel (S-CPICH), which may be broadcasted only over a part of the cell, i.e. there may be zero, one or several S-CPICH:s per cell, or dedicated pilots, i.e. a phase reference that is transmitted within the downlink dedicated physical channels. In case of beamforming, independent from being the phase reference for the beams a S-CPICH or dedicated pilots, fixed or flexible beams can be used. When fixed beams are used the coverage area of the beams are fixed. When flexible beams are used, a beam could, e.g., follow a UE.

In accordance with one embodiment of the present invention, the radio base station estimates the gain that can be achieved by beamforming and indicates that higher resource availability can be achieved to the C-RNC at a system initialisation. The admission/congestion control of the C-RNC would be based on the achieved higher resource availability. There is no problem as long as the UEs are sufficiently randomly distributed over the different beams. However, when the distribution of the UEs becomes less optimal, the base station might have to indicate a lower resource availability to the C-RNC. This could be achieved, e.g., by letting the base station indicate a lower DL-power capability to the C-RNC and possibly adjusting the consumption laws.

When the radio base station establishes a radio link, the radio link will at first be established in a sector beam, i.e. a beam covering the entire cell, and when radio base station has received information regarding the strongest directed beam, the radio base station can instruct the UE to re-tune to said strongest directed beam.

In the above-mentioned embodiment of the present invention, beamforming antennas are adopted in such a way that the S-RNC receives information of in which beam of a certain cell the UE is located, even when the UE is using radio resources controlled by a D-RNC. That information is transmitted over the Iur interface from the D-RNC to the S-RNC. As the beam coverage is selective, the resource controlling D-RNC is able to identify the position of a UE, by determining which of the antenna beams that covers the UE. The antenna beams are characterised by a number of geographical location points corresponding to the Cell Portion GAI in accordance with the present invention. Hence, the area of the cell portion corresponds to the area covered by the beam. The cells in the mobile network could thus be divided into areas that respectively corresponds to different areas covered by different beams. The division of the area of the entire cell into cell portions does not have to be fixed. In the case of flexible antenna beams, the UE is located in the same Cell Portion even if the UE moves within the cell. However, the Cell Portion GAI changes as the UE moves since the antenna beam follows the UE.

Figure 2:
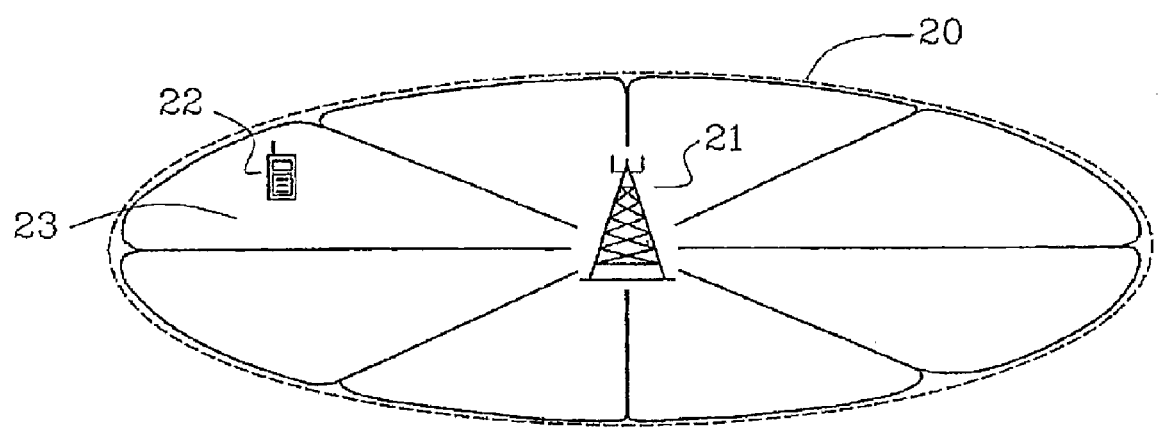
FIG. 2 shows a part of a UMTS Terrestrial Radio Access Network (UTRAN).

The resource controlling RNC can distinguish the different beams by means of the different phase references provided by S-CPICH:s or by dedicated pilots. Apparently, the accuracy will increase for smaller beam coverage areas, i.e. the accuracy depends on the number of beams per cell. FIG. 2 shows an example of a cell 20 covered by a Radio Base Station 21 providing eight beams 23 each of which covering ⅛ of the cell. It should be noted that the radio base station 21 may correspond to the radio base station 106h of FIG. 1. Thus, compared to the solution according to the state-of-the-art that only bases the positioning on the cell-ID, this embodiment according to the present invention is able to locate a UE 22 in an area 23 that is 8-times less than the cell area 20. It is one advantage of the solution according to this embodiment that it is comparatively easy to implement. Another advantage of this solution is that the design effort that already has been invested for cell planning, including a mapping of each cell with a geographical area identity in order to achieve the geographical coordinates of the cell, can be reused for the planning of the beam coverage areas by means of using the same planning tools.

Thus, the second object of the present invention is achieved by providing the S-RNC the additional information, the cell portion GAI, that can be used by the S-RNC to identify a reduced area within which the UE is located when the Iur-interface is deployed. A higher accuracy can hence be achieved by providing support for signalling of the additional information over the Iur-interface. That can be performed by introducing a new information element comprising the Cell Portion GAI to the Radio Network Subsystem Application Part (RNSAP)-protocol. The RNSAP protocol is used for communication between a S-RNC and a D-RNC when the UE has resources controlled by a D-RNC and these are either the only resources or the resources with the best quality.

The information element comprising the Cell Portion GAI is included in a data field in any of the messages that are sent from the D-RNC to the S-RNC, e.g. the Radio Link Setup Response, the Radio Link Addition Response, or Uplink Signalling Transfer messages, according to the present invention, in addition to the already standardised Cell GAI.

Thus, the method in accordance with the present invention comprises the step of:

Transmit the Cell Portion GAI, which is associated with the cell portion (23), with a Cell Portion GAI, from the radio network controlling unit that controls the resources of said radio base station to the radio network controlling unit (102a) that controls the connection of said radio base station to the mobile station.

The method may be implemented by a computer program product directly loadable into the internal memory of a radio network controlling unit 102a, 102b in a mobile telecommunication system, comprising the software code portions for performing the steps of said method. The computer program product may be stored on a computer usable medium, comprising readable program for causing a computer, within a radio network controlling unit 102a, 102b in a mobile telecommunication system, to control an execution of the steps of said method.

In general, the method according to the present invention may be applied for other kinds of positioning support and is thus not restricted to the above mentioned embodiment. Instead, the inventive method may be modified within the scope of the claims to be applicable in conjunction with other ways of defining appropriate cell portions. The cell portion is an area provided by the D-RNC, which could have it preconfigured or dynamically calculated where information on said cell portion is transmitted over the Iur-interface without the S-RNC ordering any measurement to the D-RNC.

The method according to the present invention may be used as a starting point for positioning support that gives better accuracy compared to the cell-ID based method but without increasing complexity where said initial measurement can then be refined, if necessary, by more complex methods, e.g. OTDOA or A-GPS.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a mobile telecommunication network for providing a first radio network controlling unit with positioning information for a mobile terminal located within a cell and served by a radio base station covering said cell, the cell being identifiable by means of a cell Geographical Area Information (GAI), the method comprising the steps of:

transmitting a cell GAI which is associated with a portion of the cell wherein the mobile terminal is located, from a second radio network controlling unit that controls the resources of said radio base station to the first radio network controlling unit that controls the connection of said radio base station to the mobile station, wherein the cell portion is covered by one antenna beam transmitted from said radio base station, whereby the cell portion is identifiable by identification of the antenna beam, wherein each antenna beam covers a respective cell portion and is distinguished by means of a phase reference provided by a pilot channel or by a downlink dedicated physical channel comprising dedicated pilots;

wherein the pilot channel is the Secondary Common Pilot Channel (S-CPICH);

wherein the cell portion covered by the antenna beam 1) is determined by location points describing the geographical coordinates of said antenna beam, or 2) consists of an area that extends from the Radio Base Station to the cell border within a detected angle of arrival of signals from the mobile terminal;

wherein the mobile telecommunication network is a UMTS network and the first radio network controlling unit is a first Radio Network Controller, RNC, and the second radio network controlling unit is a second Radio Network Controller, RNC;

wherein the first RNC is a serving RNC and the second RNC is a drift RNC;

wherein the drift RNC transmits the Cell Portion GAI to the serving RNC over the Iur interface; and, wherein the Cell Portion GAI is an information element of the RNSAP-protocol.

* * * * *